May 8, 1928.
W. MORRISON
ELECTROLYTIC DEVICE
Filed Sept. 15, 1924
1,668,863
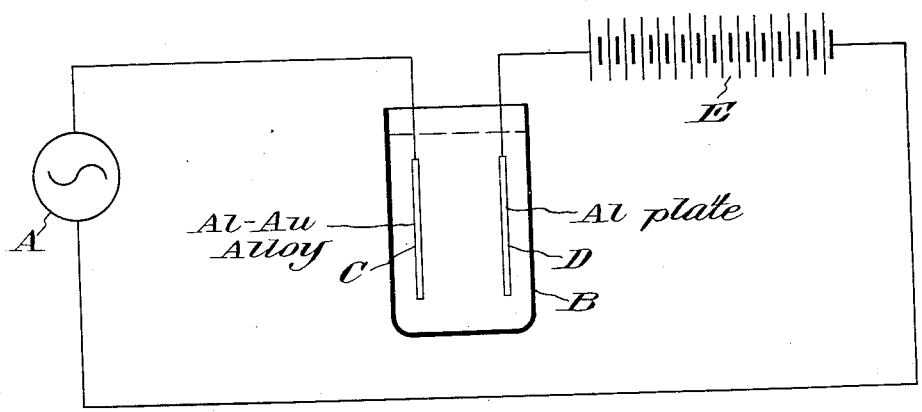
Inventor:
William Morrison
By Byrnes Townsend Brickenstein
Attorneys.

Patented May 8, 1928.

1,668,863

UNITED STATES PATENT OFFICE.

WILLIAM MORRISON, OF CHICAGO, ILLINOIS; MARGARET MORRISON ADMINISTRATRIX OF SAID WILLIAM MORRISON, DECEASED.

ELECTROLYTIC DEVICE.

Application filed September 15, 1924. Serial No. 737,924.

My invention relates to an electrolytic device of the rectifier type, which comprises two electrodes in an electrolyte.

One of these electrodes may be made of aluminum or other metal on which an asymmetric conducting film can be electrolytically formed. The other electrode is made of a filming metal having diffused or dispersed therethrough or thereon another metal which is insoluble and non-oxidizable in the electrolyte used. Preferably this result is attained by alloying aluminum or other metal on which electrolytic films can be formed, with metal such as gold, platinum, or iridium, or mixtures of these metals, which are insoluble and non-oxidizable in the electrolyte employed. Such alloy may consist for example of gold and aluminum, which readily combine in any proportions.

If two electrodes of aluminum of the same area are opposed to each other in a suitable electrolyte and connected in an alternating current circuit, no direct current will pass. If, however, one of these electrodes be formed of an alloy of aluminum and gold, a rectified direct current will pass from such electrode (anode) to the other electrode (cathode). And such current flow can be regulated up to a certain point by varying the amount of gold in the alloy electrode.

As an electrolyte may be used phosphoric acid, the phosphates of sodium, potassium or ammonium, or other suitable electrolyte, in which neither of the electrodes is soluble. With some of the anode alloys above referred to, sulfuric acid or sulfates may be used.

The cathode may be formed of any of the metals capable of having formed thereon films which will prevent flow of current in one direction, and for convenience these metals are, in the claims, referred to as "filming" metals. Examples of such metals are aluminum, bismuth and tantalum.

To form the anode of the rectifier, any of these filming metals may be alloyed with gold or any one of the metals of the platinum group (Pt, Os, Ir) or with mixtures of such metals, and these metals are, for convenience, characterized in the claims as "noble" metals.

My invention is not limited to any particular proportions, as I have found, for example, that an aluminum-gold alloy containing only one pennyweight of gold to a pound of aluminum will permit current to pass.

An important feature of my invention is that it makes possible an anode plate for electrolytic rectifiers of sufficiently large surface to obviate undue heating, and undue concentration of gas on its surface, which can still be made to deliver the necessary amount of unidirectional current at a fixed ampere rate and at any voltage obtainable with this device from a given source of alternating current. These anode plates have the further advantage when used for radio work, of greatly reducing noises, since their large surface prevents an undue concentration of gas and prevents the device from acting like an interrupter.

It is a particular feature of novelty of this invention that when the conditions have been thus adjusted, a substantially constant supply of current at the required voltage is delivered and no outside resistances or other regulating devices are needed.

For example, as shown in the accompanying diagram, A is any source of alternating current, B is a cell containing the electrolyte, C is an electrode which may be of relatively large area, formed of a suitable alloy such as aluminum and gold, D is an electrode of aluminum. Assuming that the battery E is a 24 volt battery to be charged at ¼ an ampere rate, the quantity of gold in the plate C is such that ¼ of an ampere, at the necessary voltage, will be delivered, notwithstanding that the anode plate C is of such relatively large area that no undue heating or other disadvantages due to the use of an anode of small surface occur. According to this invention, no outside resistances are needed, while if the same sized anode plates were made of lead or carbon, the quantity of current passed would be so great that some controlling means would be necessary.

While I have described my invention as an electrolytic rectifier applied to the rectification of alternating currents, it is also capable of acting as an electrolytic valve, when included either in an alternating or a direct current circuit, and the term electrolytic device used in the claims is intended to apply to all the uses to which my device is applicable.

It will be understood that the cathode plates of the rectifier may be coated with asymmetrical conducting films, during the operation of the rectifier, or preferably they may be previously coated or formed.

I claim:

1. In an electrolytic device, an electrode comprising an alloy of a filming metal and a noble metal.

2. In an electrolytic device, an electrode comprising an alloy of aluminum and a noble metal.

3. In an electrolytic device, an electrode comprising an alloy of a filming metal and gold.

4. In an electrolytic device, an electrode comprising an alloy of aluminum and gold.

5. An electrolytic device comprising a suitable electrolyte, one electrode made of a filming metal, and another electrode of an alloy of a filming metal and a noble metal.

6. An electrolytic device comprising a suitable electrolyte having one electrode made of a filming metal, and another electrode consisting of an alloy of aluminum and a noble metal.

7. An electrolytic device comprising a suitable electrolyte having one electrode made of a filming metal, and another electrode consisting of an alloy of a filming metal and gold.

8. An electrolytic device comprising a suitable electrolyte having one electrode of aluminum, and another electrode of an alloy of aluminum and gold.

In testimony whereof, I affix my signature.

WILLIAM MORRISON.